United States Patent
Black et al.

(10) Patent No.: US 12,333,365 B1
(45) Date of Patent: *Jun. 17, 2025

(54) CHIP CARD WITH ON/OFF MECHANISMS

(71) Applicant: UIPCO, LLC, San Antonio, TX (US)

(72) Inventors: Robert Lee Black, San Antonio, TX (US); Matthew Ryan Santacroce, San Antonio, TX (US); Andre Rene Buentello, San Antonio, TX (US); Jose L. Romero, Jr., San Antonio, TX (US); Timothy Blair Chalmers, San Antonio, TX (US); Samip Dilip Mehra, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/449,949

(22) Filed: Aug. 15, 2023

Related U.S. Application Data

(63) Continuation of application No. 17/719,915, filed on Apr. 13, 2022, now Pat. No. 11,783,152, which is a continuation of application No. 17/030,483, filed on Sep. 24, 2020, now Pat. No. 11,361,207.

(60) Provisional application No. 62/905,784, filed on Sep. 25, 2019.

(51) Int. Cl.
*G06K 19/073* (2006.01)
*G08B 21/24* (2006.01)

(52) U.S. Cl.
CPC . *G06K 19/07345* (2013.01); *G06K 19/07363* (2013.01); *G06K 19/0739* (2013.01); *G08B 21/24* (2013.01)

(58) Field of Classification Search
CPC ....... G06K 19/07345; G06K 19/07363; G06K 19/0739; G08B 21/24
See application file for complete search history.

(56) References Cited

U.S. PATENT DOCUMENTS

| | | | |
|---|---|---|---|
| 6,863,220 B2 | 5/2005 | Selker | |
| 8,490,880 B2 | 7/2013 | Tanner et al. | |
| 11,361,207 B1 | 6/2022 | Black et al. | |
| 11,783,152 B1 * | 10/2023 | Black | G06K 19/0739 235/492 |
| 2006/0190737 A1 | 8/2006 | Miyasaka | |
| 2009/0245029 A1 | 10/2009 | Kam | |
| 2013/0113606 A1 | 5/2013 | Etheridge et al. | |

OTHER PUBLICATIONS

Office Action mailed Aug. 26, 2021 in U.S. Appl. No. 17/030,483.
Office Action mailed Mar. 9, 2023 in U.S. Appl. No. 17/179,915.

* cited by examiner

*Primary Examiner* — Seung H Lee
(74) *Attorney, Agent, or Firm* — Plumsea Law Group, LLC

(57) ABSTRACT

Chip cards that are protected from unauthorized access to information and instructions stored in the chip card's chip by unauthorized persons using illicit devices that emulate chip readers to interrogate the chips in chip cards and obtain or download confidential data stored in the chips. The chip cards are disabled when not ready to be used, such that the chips cannot be accessed by illicit devices, thus protecting the chip card owner and/or issuer from potential losses.

20 Claims, 9 Drawing Sheets

CHIP CARD WITH ON/OFF MECHANISMS

CROSS-REFERENCE TO RELATED APPLICATIONS

This application is a continuation of U.S. patent application Ser. No. 17/719,915, filed Apr. 13, 2022 and titled "Chip Card With On/Off Mechanisms", which application is a continuation of U.S. patent application Ser. No. 17/030,483, now U.S. Pat. No. 11,361,207, filed Sep. 24, 2020 and titled "Chip Card With On/Off Mechanisms", which application claims the benefit of U.S. Provisional Patent Application No. 62/905,784, filed Sep. 25, 2019, and titled "Chip Card With On/Off Mechanisms," the disclosure of which applications are incorporated by reference herein in their entirety.

TECHNICAL FIELD

This disclosure relates to chip cards such as credit cards and debit cards that have a mechanism that could be used to prevent chip cards from being accessed by illicit devices.

BACKGROUND

Chip cards such as credit cards and debit cards are designed to be read using, for example, RFID technology, by chip readers at terminals of retailers, banks and other institutions. When these RFID chip cards are used at a retailer or a bank, for example, the system combines data stored in their chips with information provided by the terminal to create a unique encrypted code that is then used to authorize the transaction. The card data stored in the chips might be stolen by unauthorized persons using illicit RFID devices that, for example, could emulate chip readers. This stolen card data could then be used to consummate fraudulent transactions such as the purchase of expensive consumer products, or to withdraw funds from bank accounts, for example. Identity cards that are used to gain entry into restricted-entry facilities often also contain chips that might also be vulnerable to data theft, that would allow duplicate identity cards to be fabricated.

To some extent, chip cards may be vulnerable because they are normally active such that they might respond to attempts by unauthorized persons to access confidential card data stored in the chip cards even when the chip cards are not being used. For these reasons, there is a need to disable chip cards when they are not being used by the owners of the chip cards, to prevent illicit devices from obtaining sensitive information stored on the chip cards.

SUMMARY

In one aspect, embodiments include a chip card that may be disabled when it is not in use. The chip card has a chip electrically connected to an antenna for receiving electromagnetic waves from a chip reader. The chip is configured to be read by a chip reader. An electromechanical device is electrically connected to the chip. The chip has a first state and a second state. When the electromechanical device is in its first state, the chip is enabled to execute at least one of the following functions: authorize a credit card transaction, authorize a debit card transaction, and allow entry into a restricted-entry facility. When the electromechanical device is in its second state, the chip card is disabled such that it cannot authorize credit card transactions, cannot authorize debit card transactions, and cannot allow entry into any restricted-entry facility.

In another aspect, embodiments include chip card configured to be read by a chip reader. The chip card has a substrate with an embedded chip. The chip is electrically connected to an antenna also embedded in the substrate for receiving electromagnetic waves. There is a switch interposed between the antenna and the chip. The antenna is electrically connected to a first circuit in the chip when the switch is in a first state, and is not connected to the first circuit when the switch is in a second state. When the switch is in the first state the chip is enabled and when the switch is in the second state the chip is disabled.

In yet another aspect, embodiments include a chip card that has a substrate with a chip embedded in the substrate. The chip is configured to be read by a chip reader. There is a flat thin battery on the substrate which powers a sensor. A switch is electrically controlled by the sensor. When the switch is in a first position it is interposed between an antenna for receiving electromagnetic waves and a matching network in a first circuit on the chip. When the switch is in the first position the switch enables the chip card by providing an electrical path from the antenna to the matching network in the first circuit on the chip. The first circuit is configured to communicate with the chip reader to one of (1) submit a transaction for approval, (2) allow entrance to a restricted-entry facility and (3) deny entrance to a restricted-entry facility. When the switch is in a second position, the switch does not provide an electrical path to the first circuit. The sensor controls the position of the switch.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for protecting chip cards from unauthorized access to information and instructions stored in the chip card's chip. Chip cards are designed to communicate with chip readers at payment terminals or at entry points to restricted-entry facilities using electromagnetic waves. Often, these communications are effectuated using Near-Field Communication (NFC) technology, which typically operates at 13.56 MHz. Unauthorized persons may use illicit devices that emulate chip readers (such as those used at payment terminals at retailers or banks, or at entry points, for example) to interrogate the chips in chip cards and obtain or download confidential data stored in the chips. The unauthorized persons may then use this confidential data to fabricate counterfeit cards that could then be used to successfully consummate fraudulent transactions, or to gain entry to a restricted-entry facility.

As used herein, credit cards, debit cards, identity cards and other cards that use an embedded chip to provide a certain level of security shall be referred to herein as "chip cards." For convenience, the information, instructions or other data stored in the chip will be referred to herein as "confidential data." Also, for convenience, persons attempting to access chip cards in order to obtain or download confidential data shall be referred to herein as "unauthorized persons." Furthermore, although for convenience embodiments may be described herein with reference to NFC technology, the embodiments are not restricted to NFC technology but instead are applicable to any attempt to obtain confidential data from chip cards using electromagnetic waves.

Briefly, the embodiments described herein provide chip cards that may be disabled by the owner of the chip card when the cards are not in use. When the owner of a chip card is ready to use his or her chip card to, for example, purchase a consumer product or withdraw money at an ATM, the owner may enable the card by activating a mechanism such as a switch, sensor or other device. After the owner has completed the transaction, he or she may then return the mechanism to its non-enabled state to disable the chip card.

In some embodiments, if an attempt is made to use a chip card in its disabled state, the chip card may be listed as a possibly stolen card until the owner of the chip card can report that he or she still has the chip card, or can report that the chip card is missing. In those embodiments, the chip card may be protected against theft and unauthorized use of the chip card as well as being protected against theft of confidential information from the chip, as disclosed below.

In some embodiments, the chip cards may incorporate devices that protect the card owner and/or the card issuer in the event the card is lost or stolen.

Figure 1A:
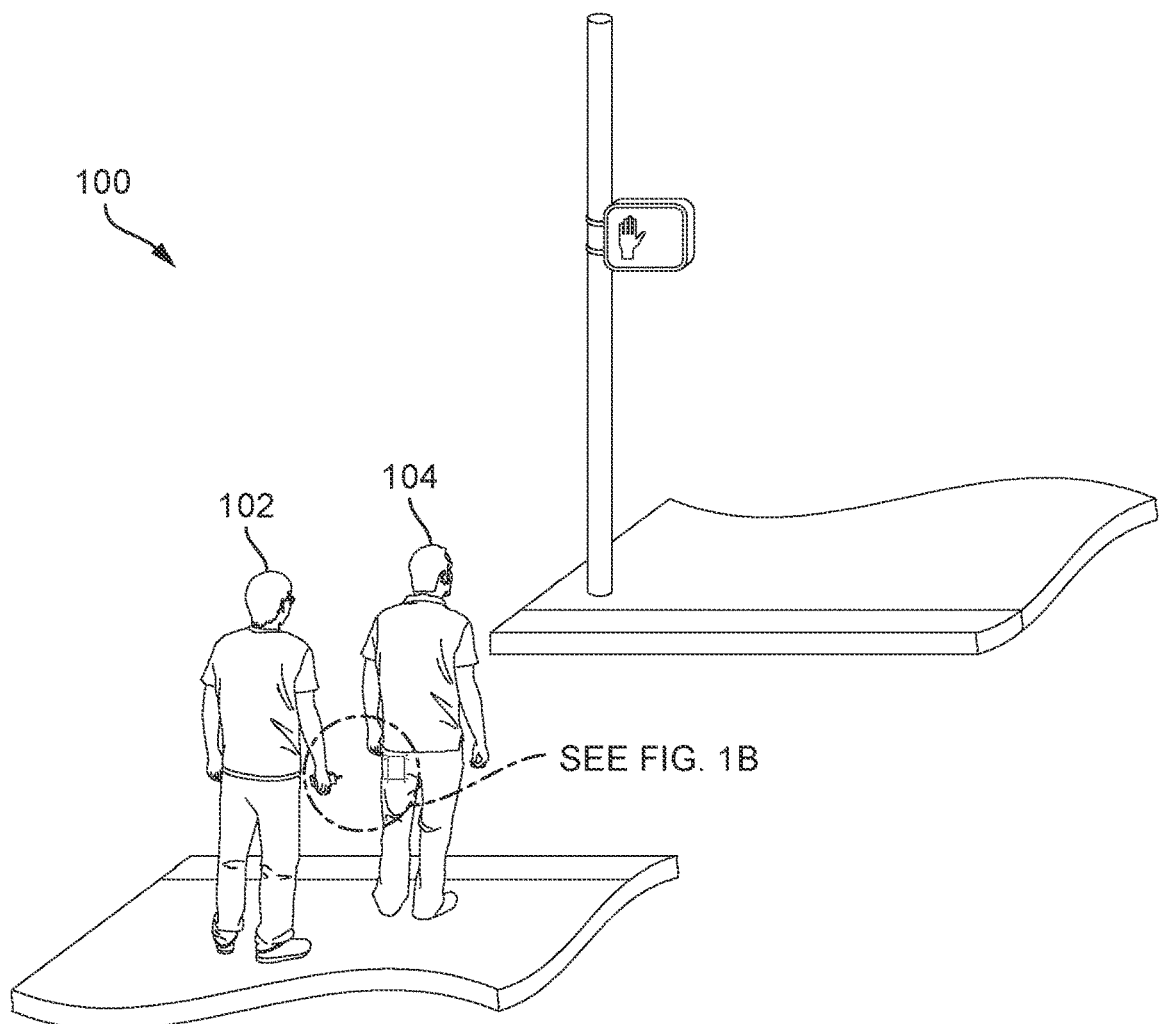
FIG. 1A illustrates a typical scenario in which an unauthorized person may use an illicit device to obtain data stored on a chip card.
Figure 1B:
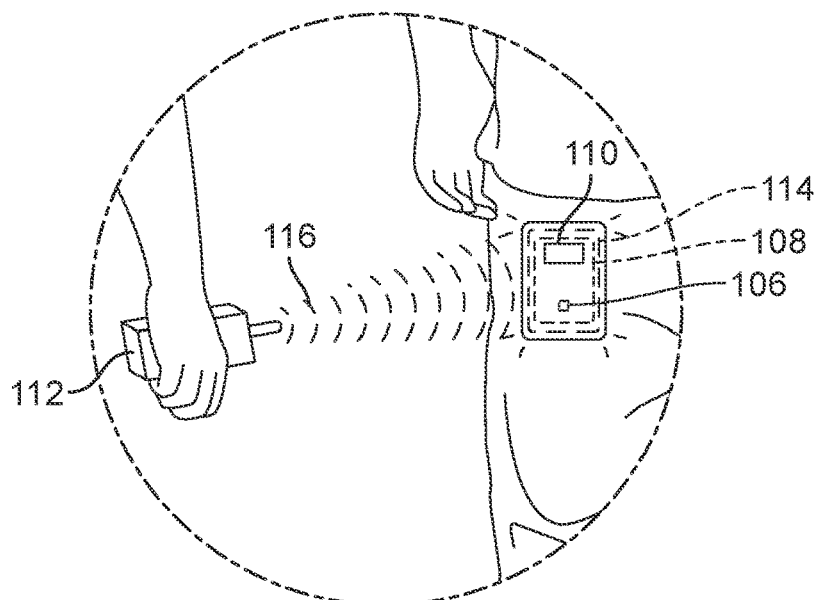
FIG. 1B. is an enlarged view of a portion of the embodiment illustrated in FIG. 1A.

FIG. 1A is a schematic illustration 100 of an unauthorized person 102 attempting to obtain confidential information from a chip card 108 carried in a wallet 114 in the back pocket of the owner 104 of chip card 108 (as shown in FIG. 1B), as owner 104 is waiting to cross the street. Unauthorized person 102 is holding an illicit device 112 that directs electromagnetic waves 116, such as NFC waves, at chip 110 on chip card 108. Chip card 108 contains a disabling device 106 that may be used to disable or enable chip 110. If chip card 108 were not in its disabled state, illicit device 112 might succeed in obtaining confidential data stored in chip 110.

Figure 2A:
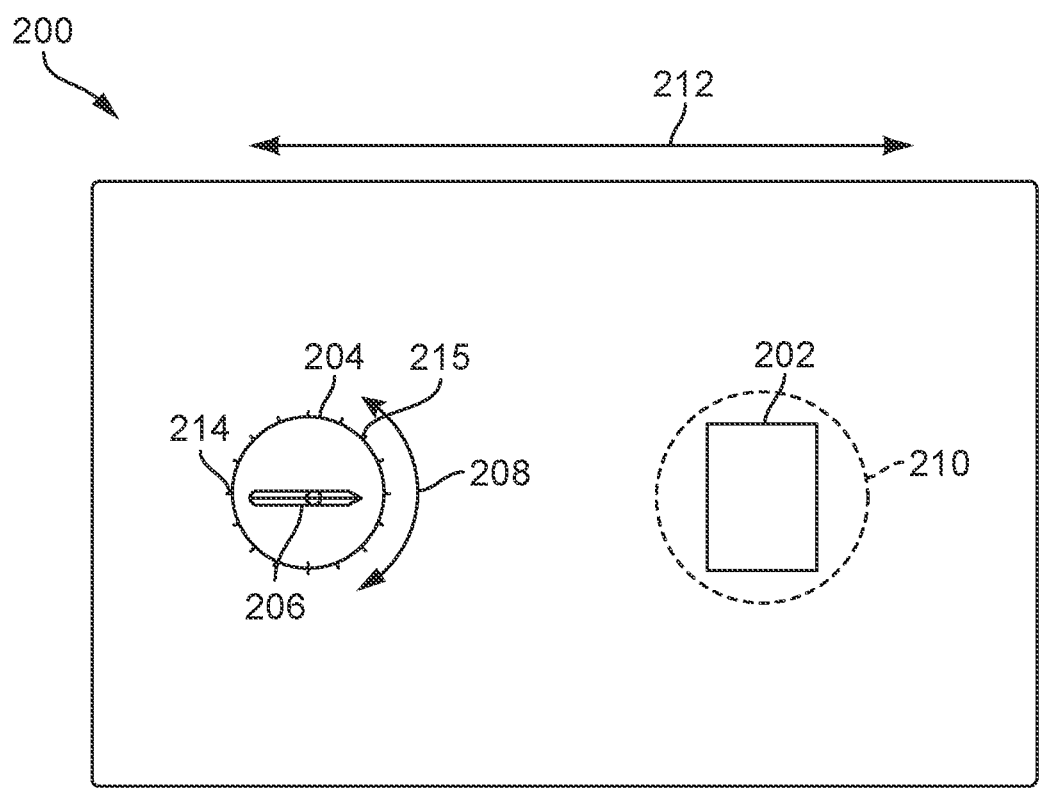
FIG. 2A illustrates an embodiment of a chip card that may be disabled to prevent theft of stored information when the chip card is not being used, in plan view.
Figure 2B:
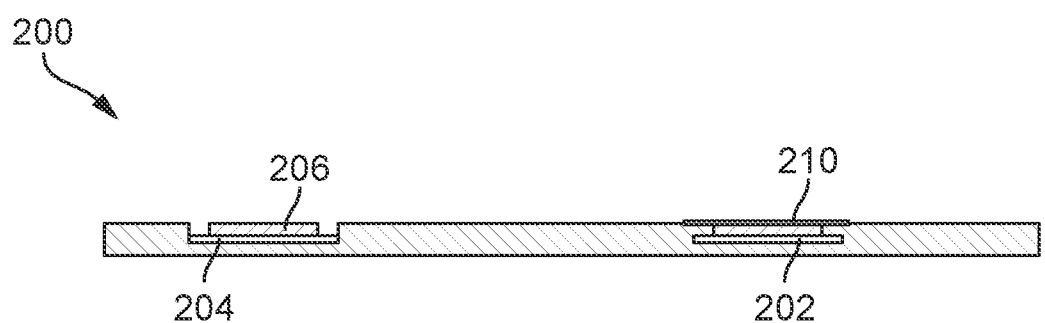
FIG. 2B is an elevation view of the embodiment of FIG. 2A.

Examples of embodiments of enabling/disabling devices that might be used with chip cards are illustrated schematically in FIG. 2A, FIG. 2B, FIG. 3A, FIG. 3B, FIG. 7A and FIG. 7B, and described below with reference to those figures. FIG. 2A and FIG. 2B are schematic diagrams illustrating a chip card 200 with a rotating dial. The chip would be disabled unless the dial is in the correct position. Chip card 200 has a chip 202 connected to an antenna 210 for receiving electromagnetic waves, such as NFC electromagnetic waves. Chip card 200 also has a mechanical rotating dial 204 that may be turned to any position, using indicator handle 206, as indicated by curved directional arrow 208. Indicator handle 206 may also serve as an indicator of the position of the dial. Mechanical rotating dial 204 and indicator handle 206 in combination with electrical terminals and conductors that connect mechanical rotating dial 204 to chip 202 form an electromechanical device that may be used to enable or disable chip 202.

In some embodiments, which are described below, if an attempt is made to use the chip card when the dial is not in the correct position, any data read from the card would be invalid data. In some of those embodiments, when invalid data is read from a chip card, the chip reader would alert the issuer of the chip card over a network, such as the Internet or a telephone or cable network. Typically, indicator handle may be kept in the longitudinal direction 212 when the chip card is not about to be used. Indicators 214, shown in FIG. 2A around the circumference of rotating dial 204, correspond to different positions of rotating dial 204. Thus, if the correct position of indicator handle 206 is at position 215, but the indicator handle is pointing in the longitudinal direction 212 when chip card 200 is being inserted into a chip reader, the chip reader would read a message from the chip indicating that the chip has been disabled and may report that event to the chip card issuer, who may then alert the chip card owner. Alternatively, or in addition, the chip reader might also alert the chip card owner directly. In any case, if the dial was in an incorrect position just because the chip card owner made a mistake, the chip card owner could then confirm that he or she still has the card. If the chip card owner does not have the chip card, he or she could then report that his or her chip card is missing, and the issuing institution could then take steps to invalidate the card.

In some embodiments, rotating dial 204 may have slight detents (not shown) around its periphery that corresponding slight bumps around the circumference of the rotating dial might fit into. This structure would provide feedback to the owner of the chip card so that he or she can be sure that he or she has rotated the rotating dial 204 to its correct enabling position. Of course, all of the incorrect positions in rotating dial switch 204 have the same "feel," such that an unauthorized user of the chip card would not know which is the correct position.

Figure 3A:
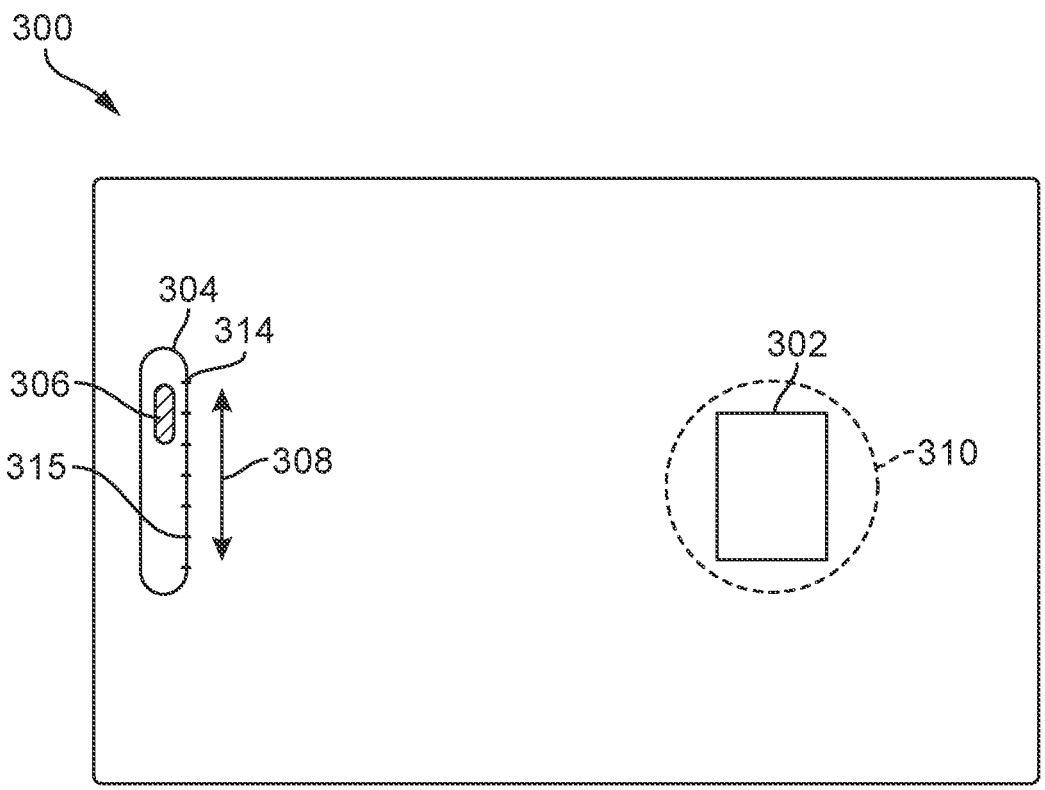
FIG. 3A is a schematic diagram of an embodiment of a chip card that may be disabled to prevent theft of stored information when the chip card is not being used, in plan view.
Figure 3B:
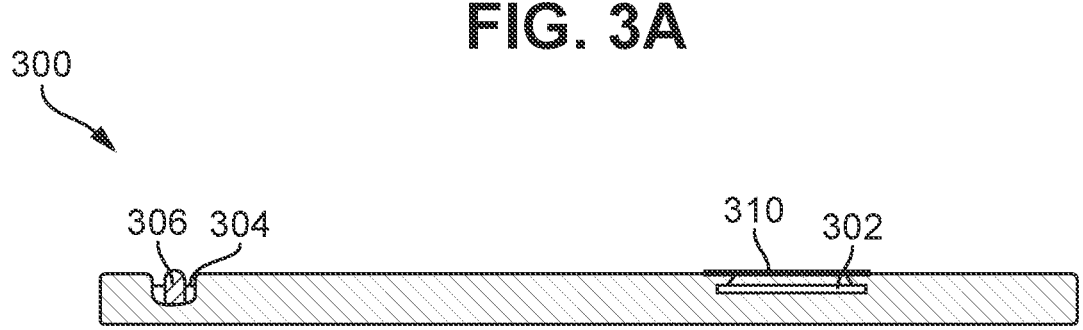
FIG. 3B is an elevation view of the embodiment of FIG. 3B.

FIG. 3A and FIG. 3B are schematic diagrams illustrating another embodiment of a chip card 300 with a chip 302 that may be disabled when not in use. Chip card 300 has an antenna 310 connected to chip 302. It also has a mechanical linear sliding switch 304 that may be moved back and forth in the directions indicated by linear directional arrow 308 using knob/indicator 306. Indicators 314, shown in FIG. 3A, correspond to different positions of knob/indicator 306. As in the case of the rotating dial embodiment, in this embodiment only one position of the linear sliding switch 304 (which is not necessarily at either end of linear sliding switch 306) is the correct position. For example, position 315 may be the correct position, and the chip card would be disabled if the linear sliding switch 306 were in any other position. In some embodiments, if an attempt is made to use chip card 300 when linear sliding switch 304 is not in the correct position 315, the data provided to the chip reader would be invalid. In some of those embodiments, when the chip reader might read this invalid data, the chip reader could then alert the issuer of the chip card over a network, such as the Internet or a telephone or cable network that an attempt may have been made to use a counterfeit or stolen chip card. If the linear sliding switch was in an incorrect position just because the chip card owner made a mistake, the chip card owner could then confirm that he or she still has the card. If the chip card owner does not have the chip card, he or she could then report that his or her card is missing, and the issuing institution could then take steps to invalidate the card. Linear sliding switch 304 and knob/indicator in combination with electrical terminals and conductors that connect linear sliding switch 304 to chip 302 form an electromechanical device that may be used to enable or disable chip 302.

In some embodiments, linear sliding switch 304 may have slight bumps (not shown) along its length that fit into corresponding slight detents along the periphery of the slot housing the linear sliding switch. This structure would provide a feedback to the owner of the chip card so that he or she can be sure that he or she has moved linear sliding switch 304 to its correct enabling position. Of course, all of the positions, correct or incorrect, in linear sliding switch 304 have the same "feel," such that an unauthorized user of the chip card would not know which is the correct position.

Figure 4:
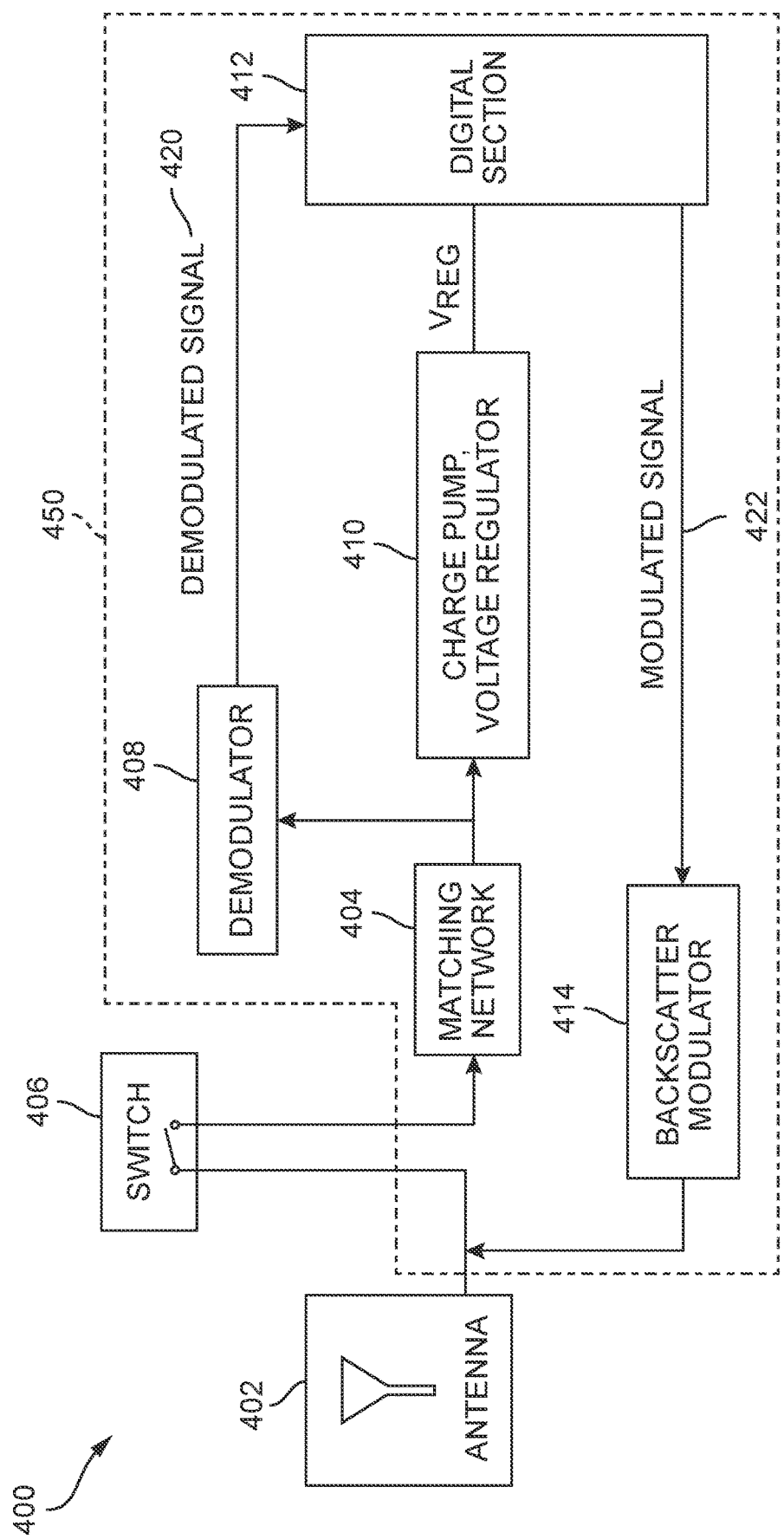
FIG. 4 is a schematic diagram showing an exemplary circuit for an RFID card such as the ones shown in FIG. 2A, FIG. 2B, FIG. 3A and FIG. 3B, in an embodiment.
Figure 5:
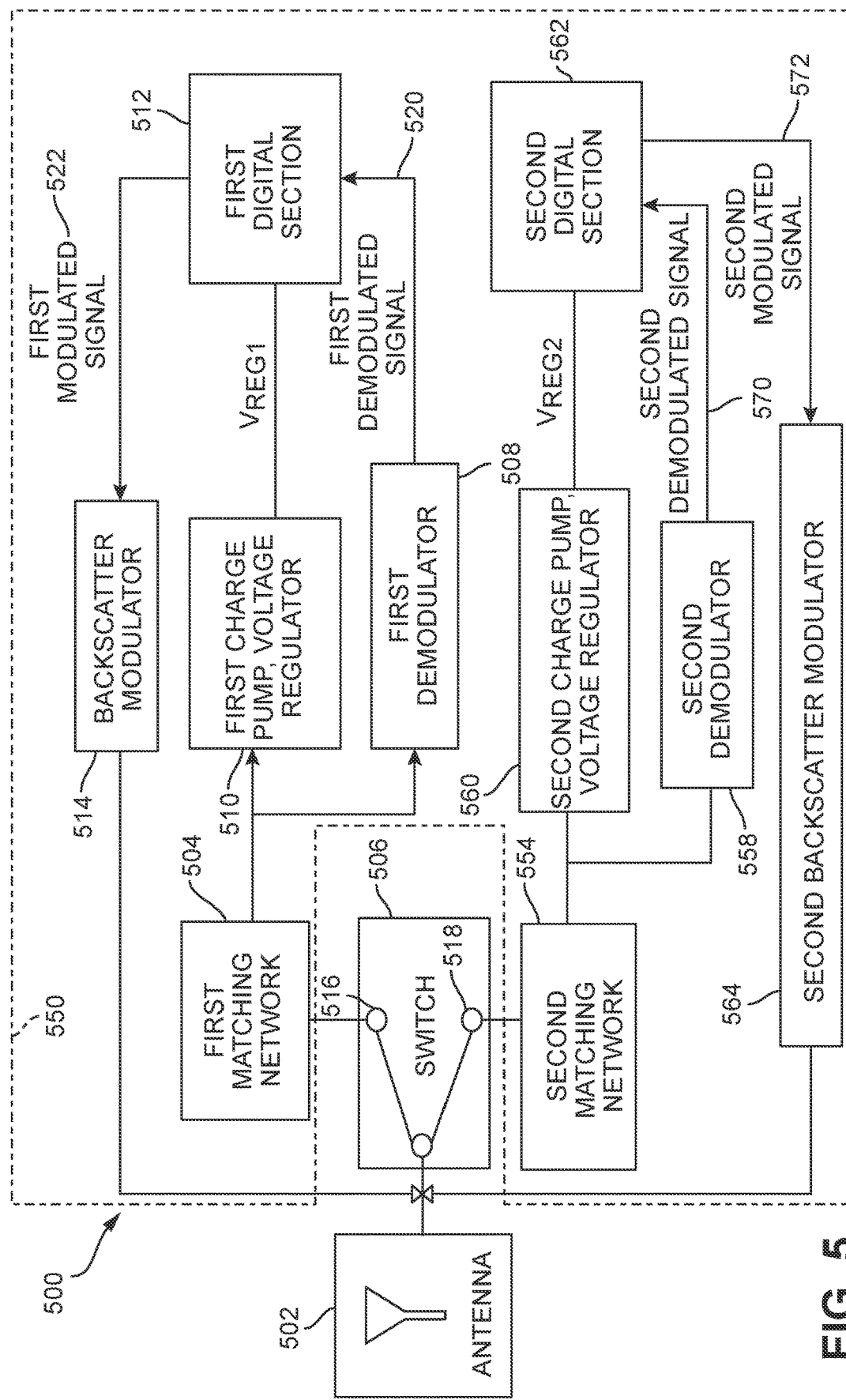
FIG. 5 is a schematic diagram showing another exemplary circuit for an RFID card such as the ones shown in FIG. 2A, FIG. 2B, FIG. 3A and FIG. 3B, in an embodiment.

Circuits that may be used in chip cards such as the chip cards illustrated in FIG. 2A, FIG. 2B, FIG. 3A and FIG. 3B are described below with reference to FIG. 4 and FIG. 5. FIG. 4 applies to embodiments of chip cards that are merely disabled when the rotating switch (FIG. 2A) or the linear sliding switch (FIG. 3A) is NOT in the correct position. FIG. 5 applies to embodiments of chip cards such as the chip cards shown in FIG. 2A and FIG. 3A that, in addition to disabling the chip card, provide invalid data to an illicit device, such as illicit device 112 shown in FIG. 1B, when the dial or the linear sliding switch is not in the correct position.

The exemplary chip card circuit 400 shown in FIG. 4 is generally similar to conventional chip card circuits except that it includes a switch 406 interposed electrically between the antenna 402 and matching network 404. Antenna 402 and switch 406 are shown in FIG. 4 as being external to chip 450, since they are illustrated outside the dashed line delineating chip 450, but all the other components of chip card circuit 400 would generally be within chip 450. Switch 406 may be the rotating dial 204 of FIG. 2A, or it may be the linear sliding switch 304 of FIG. 3A, for example. It may also be a semiconductor switch connected to a sensor, as described below with reference to FIG. 7A, FIG. 7B and FIG. 8. When switch 406 is NOT in an enabling position, switch 406 remains open and any signal broadcast by an illicit device never reaches matching network 404, charge pump and voltage regulator 410, demodulator 408 or digital section 412, for example. When switch 406 is in an enabling position, the signal received at antenna 402 is demodulated by demodulator 408 to generate a demodulated signal 420 which is then input to digital section 412. If the NFC waves received by antenna 402 are emitted by a chip reader, the chip reader can then obtain the confidential data stored in digital section 412, and combine that confidential data with information received from the chip reader to send a unique, encrypted code or token. The token is then either sent to the card issuer for verification and approval, or the token may be verified and approved within the terminal itself. Digital section 412 can then send confidential data via a modulated signal 422 back to the chip reader through backscatter modulator 414 and antenna 402.

Although not shown in FIG. 4 for simplicity, the voltage produced by charge pump and voltage regulator 410 is supplied to other components of circuit 400, such as demodulator 408, backscatter modulator 414 and any other components that might need voltage VREG for their operation.

FIG. 5 is a schematic exemplary circuit diagram 500 that may be used with the embodiments of the chip cards illustrated schematically in FIG. 2A and FIG. 3A when those chip cards respond to an attempt to use a chip card with its rotating dial or linear sliding switch in a disabling position by providing invalid data in addition to disabling the card. In FIG. 5, antenna 502 and switch 506 are external to chip 550 (as shown on FIG. 5, since they are illustrated as being outside the dashed outline delineating chip 550 in FIG. 5), while the other components would generally be within chip 550. As shown in exemplary circuit diagram 500, NFC electromagnetic waves (or other electromagnetic waves) received at antenna 502 are input to terminal 516 or terminal 518 of switch 506, depending on the physical position of, for example, indicator handle 206 of rotating switch 204 (FIG. 2A embodiment) or knob/indicator 306 of linear sliding switch 304 (FIG. 3A embodiment). Terminal 516 in FIG. 5 is the terminal that is reached when the indicator handle (FIG. 2A) or the knob/indicator (FIG. 3A) is in the correct position. When the indicator handle or the knob/indicator is in the correct position, the chip card is enabled, such that the signal received at the input to switch 506 is provided to first matching network 504, first charge pump and voltage regulator 510, first demodulator 508 and first digital section 512. First demodulated signal 520 is provided to first digital section 512, which can then send confidential information back to the chip reader on first modulated signal 522 via backscatter modulator 514 and antenna 502.

Terminal 518 in circuit 500 is reached whenever the indicator handle (FIG. 2A) or the knob/indicator (FIG. 3A) is in any position other than the correct position. In that case, the signal from antenna 502 is connected to terminal 518, the chip card is disabled and provides invalid data back to the chip reader. The signal received at terminal 518 of switch 506 is provided to second matching network 554, second charge pump and voltage regulator 560, second demodulator 558 and second digital section 562. Second demodulated signal 570 is provided to second digital section 562, which then sends invalid data back to the chip reader via backscatter modulator 564 and antenna 502. In some cases, the chip reader could then report to the card issuer or the card owner, for example, that an attempt may have been made to consummate a fraudulent transaction.

Although not shown in FIG. 5, the voltage $V_{REG1}$ produced by first charge pump and voltage regulator 510, or the voltage $V_{REG2}$ produced by second charge pump and voltage regulator 560, respectively, are supplied to their respective components of circuit 500, such as first demodulator 508, first backscatter modulator 514, second demodulator 558, second backscatter modulator 564 and any other components that might need voltage $V_{REG1}$ or $V_{REG2}$ for their operation.

Figure 6:
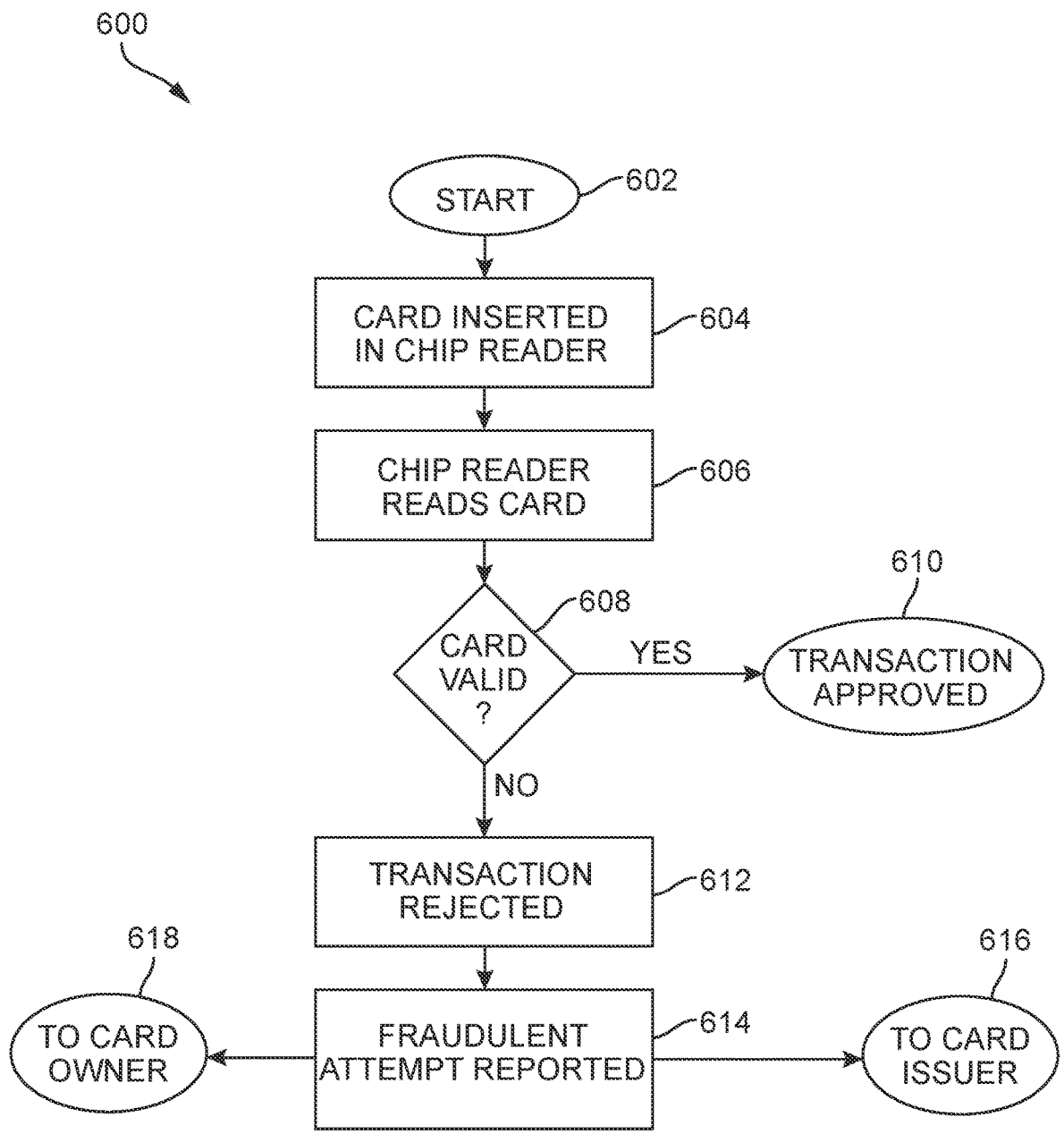
FIG. 6 is an exemplary flowchart showing a chip reader's response to an attempt to use a chip card, in an embodiment.

When a chip card is inserted into a chip reader at a retailer or a bank, for example, the chip reader must determine whether to approve or reject the attempted transaction. As discussed above with respect to FIG. 5, the chip reader may also have the capability of reporting an attempt to use a disabled chip card. An example of a flow chart that could be used by a chip reader to determine which action(s) to take is illustrated in FIG. 6. Flowchart 600 starts in step 602 when a person with a chip card approaches a chip reader at a payment terminal or at an entry point to use a chip card to purchase an item or a service at a retailer, to use the chip card at a bank or to gain entrance to a restricted-entrance facility, for example. In step 604 the person inserts the chip card in a chip reader, which then reads the card in step 606. In step 608, if the chip card has an enabling/disabling switch as in the embodiments shown in FIG. 2A or FIG. 3A, the chip reader determines whether the card is valid because it has been enabled. If the card is valid, the transaction is approved in step 610. If the card has not been enabled, the chip reader rejects the attempted transaction in step 612 because the chip card may have been invalid. In step 614, which is optional, the chip reader may decide to report the possibly fraudulent attempt. If it decides to report the attempt, it may report the attempt to the card issuer in step 616, or it may report the attempt to the card owner via email or a text message, for example in step 618, or it may report the attempt to both the card issuer and the card owner. Reporting the attempt to the card owner may be beneficial in the event that the card owner may have simply forgotten to rotate the dial or slide the switch to the correct position. Reporting the attempt to the card issuer would allow the card issuer to place the account on hold until it contacts the card owner and determines whether an attempt at consummating a fraudulent transaction has actually been made, or whether the chip card owner had simply made a mistake.

Figure 7A:
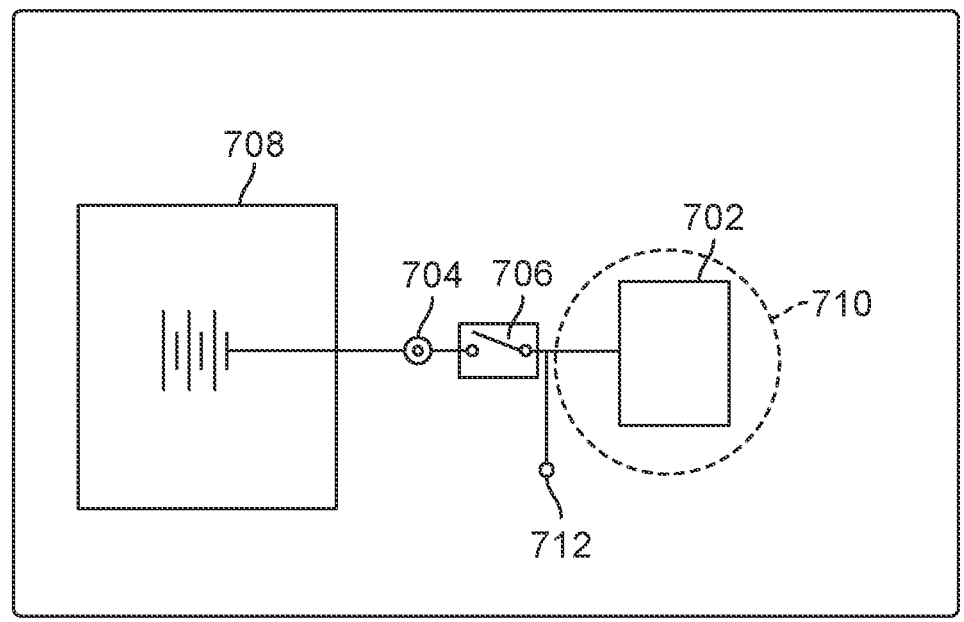
FIG. 7A is a schematic diagram of an embodiment of a battery-powered RFID chip card that may be disabled when not in use, in a plan view.
Figure 7B:
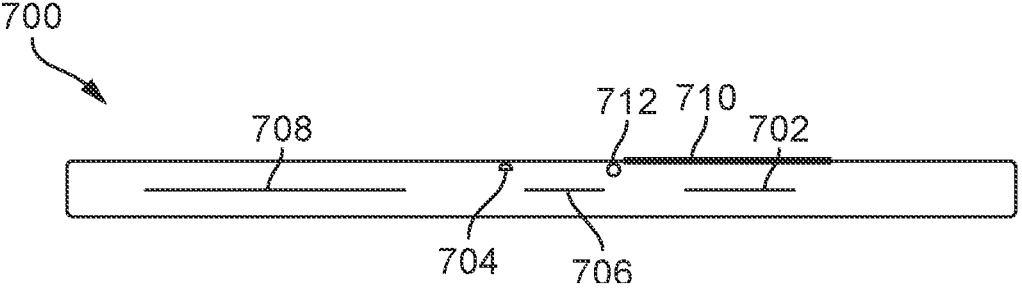
FIG. 7B is a schematic diagram of the embodiment of FIG. 7A, in an elevation view.

In some embodiments, the chip card may have its own battery to power an additional circuit on the chip card. This additional circuit would provide a sensor in addition to an electronic switch instead of having an electromechanical switch as in the FIG. 2A and FIG. 3A embodiments. This electronic switch could be incorporated within the body of the chip card, such that it would not be apparent on the face of the card as in the FIG. 2A and FIG. 3A embodiments. As shown in FIG. 7A and FIG. 7B, this embodiment has a thin-film battery 708 in chip card 700. For example, the thin-film battery may be a non-rechargeable or a rechargeable lithium polymer battery. These batteries could be, for example, 0.5 mm to 1.0 mm thick and 30-40 mm×30-40 mm square, or be rectangular with an area of 800 mm square to 2,000 mm square, for example, or could be any other shape or size that provides power effective to accomplish the enable/disable function. Thus battery 708 can power sensor 704 and switch 706. Sensor 704 may be, for example, a proximity sensor such as a capacitance sensor that then closes switch 706 when the card owner puts a finger over the sensor embedded in the chip card. Switch 706 may be located within chip 702 or external to chip 702.

Sensor 704 may also be a pressure sensor that responds when the chip card owner presses down on the sensor which then closes switch 706. Sensor 704 may also be any other type of sensor such as a temperature sensor or a force-sensitive resistive sensor, for example. In some embodiments, chip card 700 may optionally have a small LED or other type of indicator 712 to let the chip card owner know that his or her chip card has been enabled or disabled. Switch 706 may be a semiconductor switch, for example. When switch 706 is closed, for example by pressing down on sensor 704 or by touching sensor 704 for a predetermined time (such as a 2, 3 or 5 seconds, for example) the circuit in chip 702 is enabled such that the electromagnetic waves received by antenna 710 reach chip 702.

In some embodiments, chip card 702 is protected even if the chip card is lost or stolen. In those embodiments, sensor 704 may be a biometric sensor, such as a fingerprint reader. It may also be another type of biometric sensor, such as a voice recognition detector or a facial recognition detector. In those cases, the chip card is only enabled if touched by the finger of the owner or other authorized user of the chip card of the chip card when the sensor is a fingerprint sensor, or if recognized by a voice recognition detector or by a facial recognition detector.

The battery and the circuits connecting the battery to the switch and then the switch to the chip card shown in FIG. 7A and FIG. 7B may have been applied by using printing, by using electrochemistry, by using silk screening or by any other technology for depositing a thin electrically conductive layer or conductor on a chip card.

Figure 8:
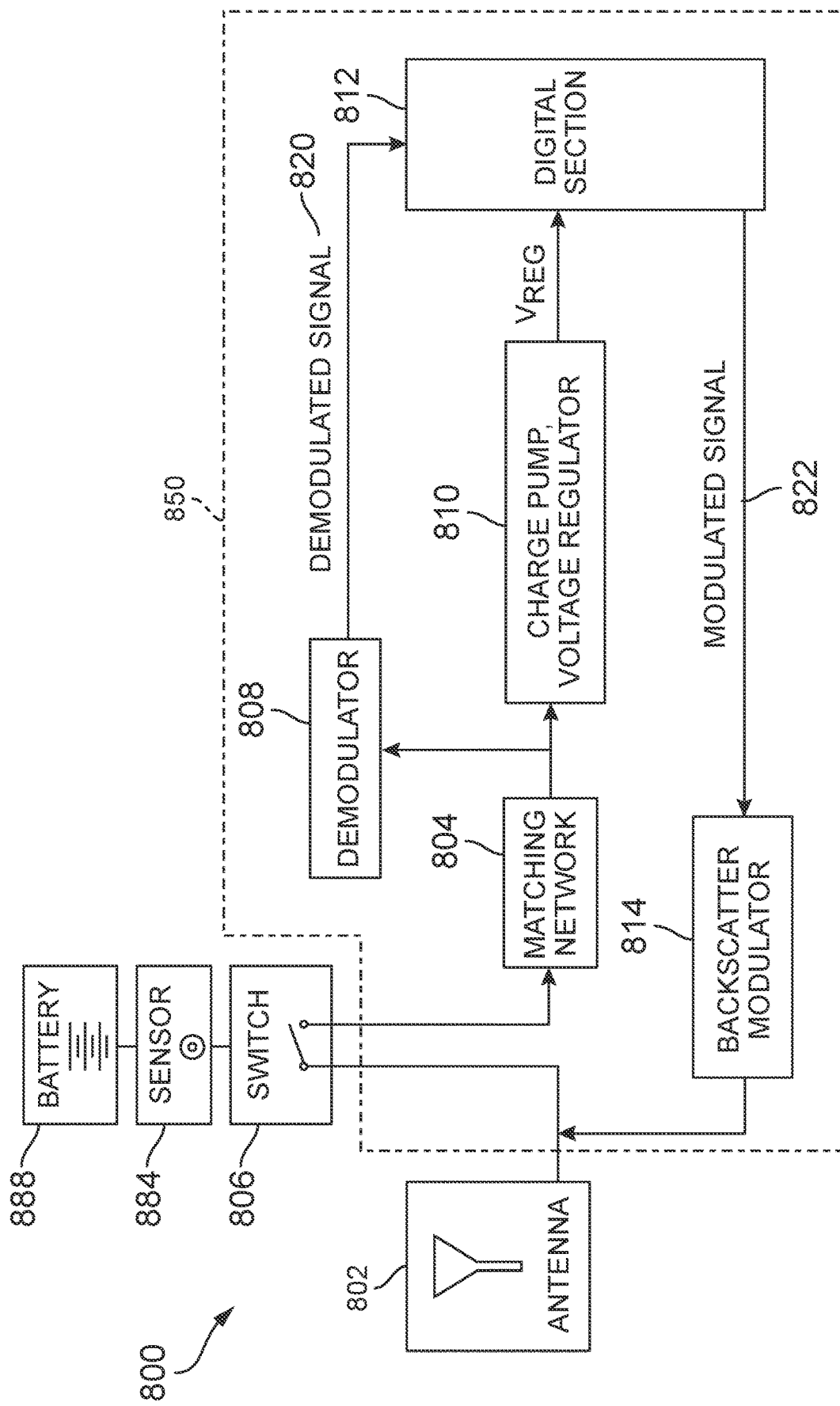
FIG. 8 is a schematic diagram of a circuit for a battery-powered RFID chip card that may be disabled when not in use, in an embodiment.

A schematic diagram of an exemplary circuit 800 for enabling or disabling chip 702 of FIG. 7A and FIG. 7B is shown in FIG. 8. Chip 850 is indicated in this schematic diagram by a dashed outline delineating which of the components of circuit 800 are within chip 850. Thus, in this embodiment, antenna 802, battery 888, sensor 884 and switch 806 are shown as being external to chip 850. As shown in FIG. 8, battery 888 provides power to one or both of sensor 884 and switch 806. When switch 806 is open, the electromagnetic waves such as NFC waves received by antenna 802 are prevented from reaching matching network 804, such that charge pump and voltage regulator 810 cannot provide any power to any of the components of the circuit 800, such as demodulator 808, digital section 812 or backscatter modulator 814. If switch 806 is closed, circuit 800 is operational and the chip card is enabled. Specifically, the signal received at antenna 802 is demodulated by demodulator 808, demodulated signal 820 is input to digital section 812, and digital section 812 may respond by transmitting a modulated signal 822 back through antenna 802 via backscatter modulator 814.

Figure 9:
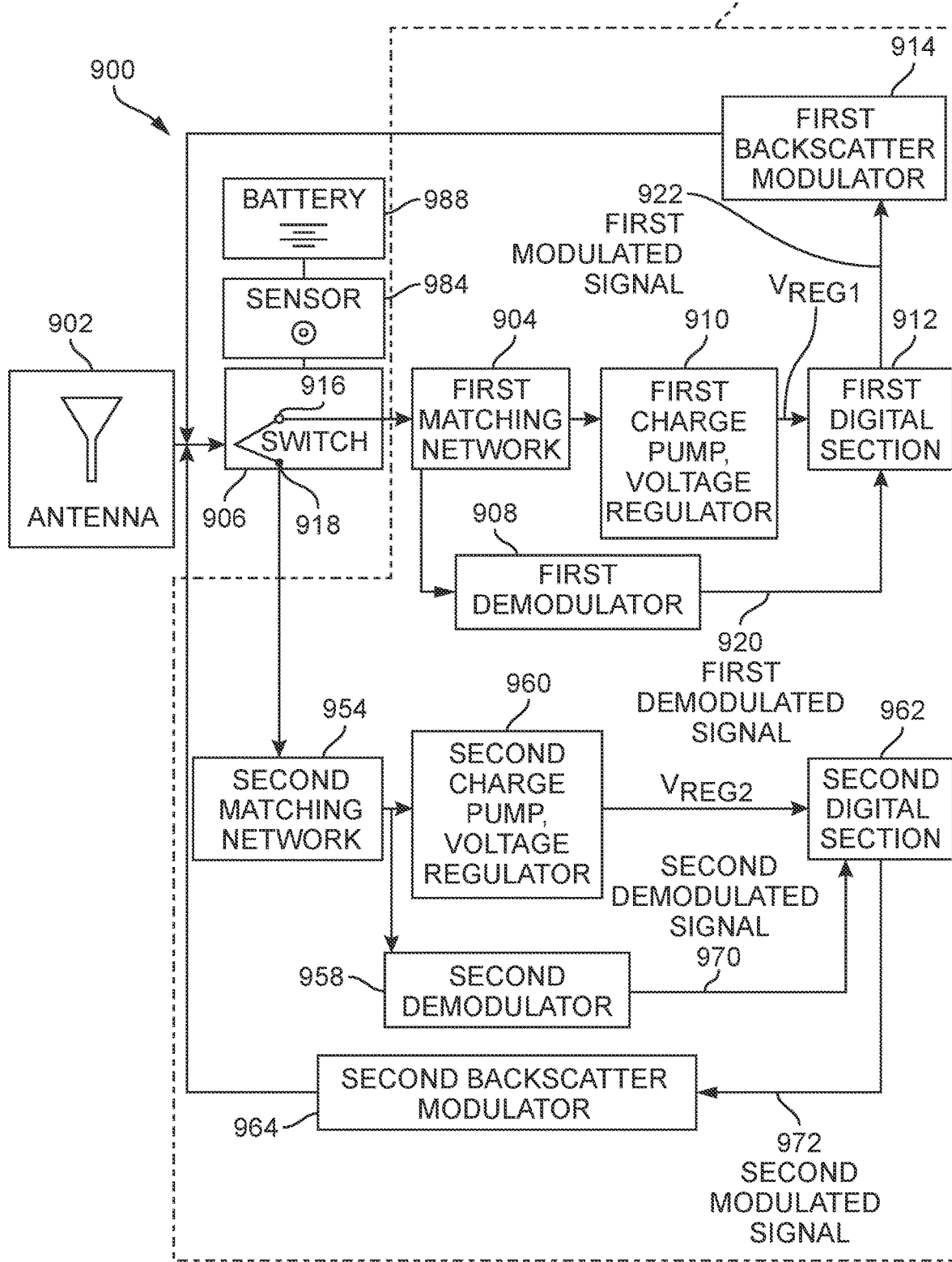
FIG. 9 is a schematic diagram of a circuit for a battery-powered RFID chip card that may be disabled, in an embodiment.

FIG. 9 is a schematic circuit diagram illustrating another circuit 900 that may be used with the battery-powered chip card shown in FIG. 7A and FIG. 7B. This embodiment applies particularly to embodiments of battery-powered chip cards that use biometric sensors, such as fingerprint sensors, voice recognition sensors or facial recognition sensors or other biometric sensors, to enable the chip card, although it may also apply to the other battery-powered embodiments disclosed herein. In this embodiment, if a chip card is stolen or lost, and then an attempt is made to access the stolen or lost chip card with an illicit device when the chip card is in its disabled state, the chip card returns invalid data to the illicit device.

As shown in FIG. 9, battery 988 provides power to one or both of sensor 984 and switch 906. In the embodiment shown in FIG. 9, antenna 902, battery 988, sensor 984 and switch 906 are external to chip 950, as indicated by the dashed outline identifying the components that may be within chip 950 from those components that may be external to chip 950. If sensor 988 determines that the chip card owner is using his or her chip card, the electromagnetic waves such as NFC waves received by antenna 902 are directed to terminal 916 of switch 906. Sensor 988 may identify the user as an authorized person either because the sensor has recognized the chip owner's fingerprint on the sensor or because it has identified the person using the chip card as an authorized user in some other way.

The signal from antenna 902 then reaches first matching network 904, and is regulated by first charge pump and voltage regulator 910 to provide a voltage $V_{REG1}$ to the components of the circuit 900, such as first demodulator 908, first digital section 912 and first backscatter modulator 914 (although for simplicity, only the voltage connection to digital section 912 is shown). The output of first matching network 904 is input to first modulator 908, which generates first demodulated signal 920 as its output. First demodulated signal 920 is then input to first digital section 912, which can execute the operations necessary to validate the chip card (assuming that the chip card is valid, has not expired, is not a credit or debit card that has exceeded its credit limit or cannot be used for some non-fraudulent reason). First digital section 912 can communicate back to the chip reader by sending first modulated signal 922 back through backscatter modulator 914 and antenna 902. In that case, the chip card is enabled and the chip card owner can consummate his transaction or can gain access to a restricted-access facility.

If sensor 988 cannot identify the fingerprint on the sensor as belonging to the chip card owner (or in some cases as belonging to an authorized person), the electromagnetic waves such as NFC waves received by antenna 902 are directed to terminal 918 of switch 906. The signal is then received by second matching network 954 and second charge pump and voltage regulator 960. Second charge pump and voltage regulator provides a voltage $V_{REG2}$ to devices that need voltage for their operation, such as second digital section 962, second demodulator 958 and second backscatter modulator 964, although for simplicity only the voltage connection to digital section 962 is shown. The output from second matching network 954 is then supplied to second demodulator 958, which generates second demodulated signal 970. Second demodulated signal 970 is then input to second digital section 962, which in turn generates invalid data that is sent with second modulated signal 972 to second backscatter modulator 964. The modulated signal produced by second backscatter modulator 964 is then transmitted back with its invalid data to the chip reader, which rejects the chip card, and may report the attempt to the chip issuer and/or the chip owner, as described above with reference to FIG. 6.

The descriptions in the preceding paragraph also applies to chip cards that use voice recognition detectors or facial recognition detectors as the biometric sensors.

Various variations of chip cards that can be enabled or disabled by an on/off switch include, for example, chip cards that use other types of devices to enable or disable the operation of chip cards. Also, the location of the switches, chips and batteries shown in the schematic diagrams are merely exemplary, and numerous different configurations and layouts of these devices on the chip card may be used. Furthermore, the circuits shown above in FIG. 4, FIG. 5, FIG. 8 and FIG. 9 are also exemplary and the functions and operations performed by those circuits may be performed by many other electronic circuits.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for disabling a chip card when the chip card is not in use, the method comprising:
 providing a chip card having a chip electrically connected to an antenna for receiving electromagnetic waves from a chip reader and an electromechanical device electrically connected to the chip, the electromechanical device having multiple different positions, each position corresponding to an indicator disposed on the chip card;
 placing the electromechanical device in a first state;
 executing at least one of the following functions using the chip card with the electromechanical device in the first state: authorizing a credit card transaction, authorizing a debit card transaction, and allowing entry into a restricted-entry facility;
 placing the electromechanical device in a second state;
 disabling the chip card when the electromechanical device is in the second state such that the chip card cannot authorize at least one of the following functions: credit card transactions, debit card transactions, and allowing entry into any restricted-entry facilities.

2. The method according to claim 1, wherein the electromechanical device is a rotating dial and wherein the method further comprises turning the rotating dial to a first position to place the electromechanical device in the first state.

3. The method according to claim 2, wherein indicators corresponding to each position of the rotating dial are disposed around a circumference of the rotating dial.

4. The method according to claim 2, wherein the method further comprises turning the rotating dial to a second position that is different from the first position to place the electromechanical device in the second state.

5. The method according to claim 1, further comprising providing invalid data to any device that attempts to obtain confidential data stored in the chip when the electromechanical device is in the second state.

6. The method according to claim 1, wherein the electromechanical device is a switch interposed between an antenna for receiving electromagnetic waves and a matching network forming a first circuit, the method further comprising:
 closing the switch in the first state such that first circuit is powered.

7. The method according to claim 6, further comprising:
 opening the switch in the second state such that the first circuit is not powered.

8. The method according to claim 1, wherein the electromechanical device is a switch having a first terminal connecting an antenna for receiving electromagnetic waves with a first matching network forming a first circuit and a second terminal connecting the antenna with a second matching network forming a second circuit, the method further comprising:
 connecting the antenna to the first matching network via the first terminal when the switch is in the first state; and
 connecting the antenna to the second matching network via the second terminal when the switch is in the second state.

9. The method according to claim 8, further comprising providing invalid data to any device that attempts to obtain confidential data stored in the chip when the antenna is connected to the second matching network.

10. A method for disabling a chip card when the chip card is not in use, the method comprising:
- providing a chip card having a chip electrically connected to an antenna for receiving electromagnetic waves from a chip reader, a sensor, and a switch interposed between the antenna and the chip that is electrically controlled by the sensor, wherein the antenna is electrically connected to a first circuit in the chip when the switch is in a first state and is not connected to the first circuit when the switch is in a second state;
- placing the switch in the first state;
- executing at least one of the following functions using the chip card with the switch in the first state: authorizing a credit card transaction, authorizing a debit card transaction, and allowing entry into a restricted-entry facility;
- placing the switch in the second state;
- disabling the chip card when the switch is in the second state such that the chip card cannot authorize at least one of the following functions: credit card transactions, debit card transactions, and allowing entry into any restricted-entry facilities.

11. The method according to claim 10, wherein when the switch is in the second state the antenna is electrically connected to a second circuit and the method further comprises:
- providing invalid data to any device that attempts to obtain confidential data stored in the chip when the antenna is electrically connected to the second circuit.

12. The method according to claim 10, wherein placing the switch in the first state comprises an owner of the chip card putting a finger on the sensor.

13. The method according to claim 12, wherein the sensor places the switch in the first state when the owner of the chip card presses down on the sensor for a predetermined time.

14. The method according to claim 10, wherein the chip card further includes an indicator and the method further comprises using the indicator to indicate to an owner of the chip card whether the chip is in the first state or the second state.

15. The method according to claim 10, wherein the sensor is a biometric sensor and wherein placing the switch in the first state comprises using the biometric sensor to recognize an owner of the chip card.

16. The method according to claim 15, wherein the biometric sensor is one of a fingerprint sensor, a voice recognition detector, or a facial recognition detector.

17. The method according to claim 10, further comprising reporting an attempt to obtain confidential data stored in the chip when the switch is in the second state to at least one of an issuer of the chip card or an owner of the chip card.

18. The method according to claim 10, further comprising placing an account associated with the chip card on hold in response to an attempt to obtain confidential data stored in the chip when the switch is in the second state.

19. The method according to claim 10, wherein the chip card further includes a flat thin battery and wherein the sensor is powered by the flat thin battery.

20. The method according to claim 10, further comprising:
- transmitting a modulated signal back through the antenna via a backscatter modulator when the switch is in the first state.

* * * * *